United States Patent
Kim et al.

(10) Patent No.: US 10,311,610 B2
(45) Date of Patent: Jun. 4, 2019

(54) SYSTEM AND METHOD FOR GENERATING CARTOON DATA

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Dai Hyun Lim, Seongnam-si (KR); Byoung Kwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 34 days.

(21) Appl. No.: 14/995,386

(22) Filed: Jan. 14, 2016

(65) Prior Publication Data
US 2016/0284111 A1    Sep. 29, 2016

(30) Foreign Application Priority Data
Mar. 25, 2015 (KR) .......................... 10-2015-0041652

(51) Int. Cl.
*G06T 11/60*    (2006.01)

(52) U.S. Cl.
CPC .................................... *G06T 11/60* (2013.01)

(58) Field of Classification Search
CPC combination set(s) only.
See application file for complete search history.

(56) References Cited

U.S. PATENT DOCUMENTS

| 5,557,684 A | * | 9/1996 | Wang | G06K 9/38 348/E5.066 |
| 5,687,306 A | * | 11/1997 | Blank | H04N 1/3873 345/634 |
| 5,867,166 A | * | 2/1999 | Myhrvold | G06T 11/001 345/419 |
| 5,892,521 A | * | 4/1999 | Blossom | G06T 15/503 345/473 |

(Continued)

FOREIGN PATENT DOCUMENTS

| JP | 5432933 B2 | 12/2013 |
| KR | 10-2005-0078100 A | 8/2005 |
| KR | 10-0938208 B1 | 1/2010 |

OTHER PUBLICATIONS

Korean Office Action of the Korean Patent Application No. 10-2015-0041652, dated Feb. 16, 2015.
(Continued)

*Primary Examiner* — Motilewa Good Johnson
(74) *Attorney, Agent, or Firm* — Greer Burns & Crain, Ltd.

(57) ABSTRACT

A cartoon data generating system includes a receiving unit configured to receive a layer selection signal for selecting at least one layer from cartoon data including a cut generated from a combination of at least one layer including different stories and an effect application signal for applying a predetermined effect to the at least one selected layer; a determination unit configured to determine a layer satisfying an expansion condition among the at least one selected layer; and a controller configured to expand the layer satisfying the expansion condition to a predetermined size and generate an effect cut from a combination of the expanded layer to which the predetermined effect is applied and another layer.

14 Claims, 13 Drawing Sheets

(56) References Cited

U.S. PATENT DOCUMENTS

| | | | | |
|---|---|---|---|---|
| 5,982,350 A * | 11/1999 | Hekmatpour | ............ | H04N 5/262 345/473 |
| 6,195,101 B1 * | 2/2001 | Ghislain Bossut | ..... | G06T 11/60 345/629 |
| 6,226,015 B1 * | 5/2001 | Danneels | ................ | G06T 13/80 345/473 |
| 6,266,068 B1 * | 7/2001 | Kang | ................ | G06T 11/60 345/422 |
| 6,285,381 B1 * | 9/2001 | Sawano | ................ | G06T 19/20 345/582 |
| 6,292,194 B1 * | 9/2001 | Powell, III | ............ | G06T 11/001 345/582 |
| 6,522,329 B1 * | 2/2003 | Ihara | ................ | G06T 11/20 345/441 |
| 6,605,105 B1 * | 8/2003 | Cuschieri | ............ | A61B 17/2909 606/208 |
| 6,686,918 B1 * | 2/2004 | Cajolet | ................ | G06T 13/00 345/419 |
| 6,803,923 B1 * | 10/2004 | Hamburg | ............ | G06T 15/503 345/629 |
| 7,095,423 B2 * | 8/2006 | Cosman | ................ | G06T 17/05 345/629 |
| 7,167,189 B2 * | 1/2007 | Di Lelle | ............ | G06T 15/503 345/677 |
| 7,432,940 B2 * | 10/2008 | Brook | ................ | G11B 27/11 345/629 |
| 7,724,208 B1 * | 5/2010 | Engel | ................ | G02B 27/2278 345/4 |
| 7,872,688 B2 * | 1/2011 | Relan | ................ | G11B 27/034 348/578 |
| 7,895,536 B2 * | 2/2011 | Fitzmaurice | ......... | G06F 3/0481 715/860 |
| 8,049,755 B2 * | 11/2011 | Kang | ................ | G06F 17/214 345/467 |
| 8,130,226 B2 * | 3/2012 | Brunner | ............... | G06T 13/00 345/473 |
| 8,160,392 B1 * | 4/2012 | Chien | ................ | G06T 11/60 382/284 |
| 8,161,379 B2 * | 4/2012 | Waltman | ............... | G06T 11/60 715/247 |
| 8,645,870 B2 * | 2/2014 | Berger | ................ | G06T 11/60 715/856 |
| 8,831,379 B2 * | 9/2014 | Wen | ................ | G06K 9/00228 345/629 |
| 8,963,926 B2 * | 2/2015 | Brown | ................ | G06T 13/20 345/473 |
| 9,019,300 B2 * | 4/2015 | Brunner | ............... | G06T 13/00 345/619 |
| 9,177,401 B2 * | 11/2015 | Campbell | ............ | G06T 11/60 |
| 9,530,183 B1 * | 12/2016 | Hu | ............ | G06T 3/40 |
| 9,569,078 B2 * | 2/2017 | Cherna | ............ | G06F 3/0484 |
| 9,965,879 B2 * | 5/2018 | Kim | ............ | G06T 11/60 |
| 10,073,601 B2 * | 9/2018 | Kim | ............ | G06F 3/04845 |
| 10,074,204 B2 * | 9/2018 | Kim | ............ | G06T 11/60 |
| 10,171,627 B2 * | 1/2019 | Lincoln | ............ | H04L 67/34 |
| 2002/0140740 A1 * | 10/2002 | Chen | ............ | G06F 3/0481 715/810 |
| 2003/0007700 A1 * | 1/2003 | Gutta | ............ | G06T 17/00 382/282 |
| 2003/0146915 A1 * | 8/2003 | Brook | ............ | G11B 27/11 345/473 |
| 2005/0046630 A1 * | 3/2005 | Jacob | ............ | G06T 13/00 345/475 |
| 2005/0057576 A1 * | 3/2005 | Shen | ............ | G06T 11/60 345/619 |
| 2006/0055700 A1 * | 3/2006 | Niles | ............ | G06T 13/20 345/473 |
| 2006/0214935 A1 * | 9/2006 | Boyd | ............ | G06F 9/4428 345/473 |
| 2008/0143745 A1 * | 6/2008 | Jin | ............ | G06T 3/4038 345/629 |
| 2010/0110082 A1 * | 5/2010 | Myrick | ............ | G06T 13/80 345/473 |
| 2011/0170008 A1 * | 7/2011 | Koch | ............ | H04N 9/75 348/592 |
| 2012/0001924 A1 * | 1/2012 | Richardson | ............ | G06T 13/80 345/473 |
| 2012/0075284 A1 * | 3/2012 | Rivers | ............ | G06T 3/4007 345/419 |
| 2012/0218262 A1 * | 8/2012 | Yomdin | ............ | G06T 13/40 345/419 |
| 2013/0124980 A1 * | 5/2013 | Hudson | ............ | G06F 17/21 715/243 |
| 2013/0235074 A1 * | 9/2013 | Cherna | ............ | G06T 11/60 345/619 |
| 2013/0314749 A1 * | 11/2013 | Boyd | ............ | G11B 27/031 358/1.18 |
| 2014/0022405 A1 * | 1/2014 | Muhrke | ............ | H04N 5/2228 348/222.1 |
| 2014/0035950 A1 * | 2/2014 | Jonsson | ............ | G06T 11/60 345/629 |
| 2015/0093029 A1 * | 4/2015 | Tijssen | ............ | G06T 11/00 382/173 |
| 2016/0358367 A1 * | 12/2016 | Metz | ............ | G06F 17/212 |

OTHER PUBLICATIONS

Chinese Office Action issued in corresponding to Chinese Patent application No. 201610080719.X. dated Aug. 1, 2018 (with translation).

* cited by examiner

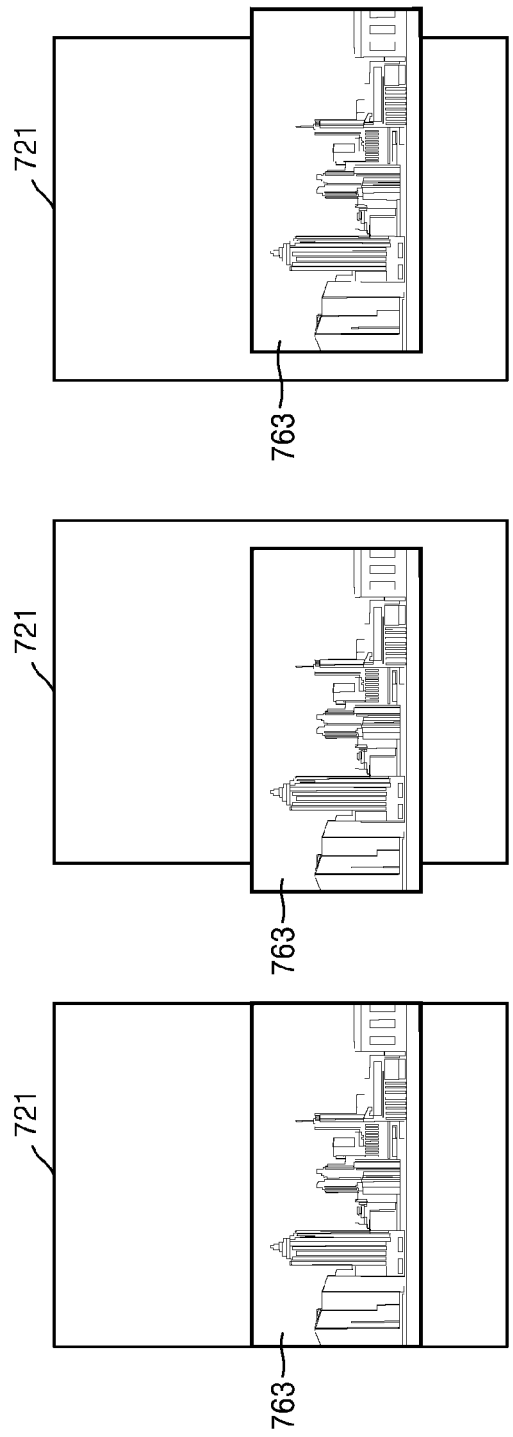

SYSTEM AND METHOD FOR GENERATING CARTOON DATA

CROSS-REFERENCE TO RELATED APPLICATION

This application claims the benefit of Korean Patent Application No. 10-2015-0041652, filed on Mar. 25, 2015, in the Korean Intellectual Property Office, the disclosure of which is incorporated herein in its entirety by reference.

BACKGROUND

1. Field

One or more exemplary embodiments of the present invention relate to a system and method for generating cartoon data.

2. Description of the Related Art

A cartoon is a picture intended to satirize or criticize life or society by exaggerating or omitting the features of an object using humor, caricature, satire, etc. Cartoons are classified into various fields, e.g., a romance cartoon, a martial arts cartoon, an action cartoon, a comic cartoon, a sports cartoon, a science fiction (SF) cartoon, etc., according to the contents thereof. A cartoon may show human complex attitudes using a visual system of pictures (images) and characters (text) and is thus more effective to draw the attention of readers than a general book only containing characters.

Recently, with the advancement in communication technology, cartoons have been provided not only through cartoon books but also via the Internet or the like.

Information disclosed in this Background section was already known to the inventors before achieving the inventive concept or is technical information acquired in the process of achieving the inventive concept. Therefore, it may contain information that does not form the prior art that is already known to the public in this country.

SUMMARY

One or more exemplary embodiments are directed to generating cartoon data by applying a desired effect to one layer selected from a cartoon data cut including at least one layer, thereby causing a user who views the cartoon data to have an interest in the cartoon data.

One or more exemplary embodiments are directed to generating cartoon data in a natural way by expanding one layer selected from a cartoon data cut including at least one layer to a desired size and applying a desired effect to the expanded layer, thereby causing a user who views the cartoon data to have an interest in the cartoon data.

One or more exemplary embodiments are directed to generating cartoon data in a natural way by expanding one layer selected from a cartoon data cut including at least one layer to a desired size, applying a desired effect to the expanded layer, and decreasing the size of the layer to the original size thereof, thereby causing a user who views the cartoon data to have an interest in the cartoon data.

Additional aspects will be set forth in part in the description which follows and, in part, will be apparent from the description, or may be learned by practice of the presented embodiments.

According to one or more exemplary embodiments, a cartoon data generating system includes a receiving unit configured to receive a layer selection signal for selecting at least one layer from cartoon data including a cut generated from a combination of at least one layer and an effect application signal for applying a predetermined effect to the at least one selected layer; a determination unit configured to determine a layer satisfying a predetermined expansion condition among the at least one selected layer; and a controller configured to expand the layer satisfying the predetermined expansion condition to a predetermined size and generate an effect cut from a combination of the expanded layer to which the predetermined effect is applied and another layer.

The determination unit may determine, as the layer satisfying the predetermined expansion condition, the at least one selected layer having an interface surface which is the same as an interface surface of the cut.

The determination unit may determine, as the layer satisfying the predetermined expansion condition, the at least one selected layer, the difference between the interface surface of which and an interface surface of the cut is in a predetermined range.

The controller adjusts a degree to which the layer satisfying the predetermined expansion condition is to be expanded, based on a direction in and a degree to which the predetermined effect is to be applied, which are indicated in the predetermined effect application signal received by the receiving unit.

The controller may set the expanded layer to be restored to an original size thereof after displaying of the effect cut ends.

According to one or more exemplary embodiments, a user terminal includes a display unit configured to display at least one layer selected from cartoon data including a cut, which is generated from a combination of at least one layer, according to a layer selection signal, and display a layer satisfying a predetermined expansion condition among the at least one selected layer according to an effect application signal for applying a predetermined effect to the at least one selected layer; and a controller configured to expand the layer satisfying the predetermined expansion condition to a predetermined size, generate an effect cut from a combination of the expanded layer to which the predetermined effect is applied and another layer, and output the effect cut to the display unit.

The controller may adjust a degree to which the layer satisfying the predetermined expansion condition is to be expanded, based on a direction in and a degree to which the predetermined effect is to be applied, which are indicated in the effect application signal.

The controller may control the expanded layer to be restored to an original size thereof after displaying of the effect cut ends.

According to one or more exemplary embodiments, a method of generating cartoon data includes receiving a layer selection signal for selecting at least one layer from cartoon data including a cut generated from a combination of at least one layer, and an effect application signal for applying a predetermined effect to the at least one selected layer, performed by a receiving unit; determining a layer satisfying a predetermined expansion condition among the at least one selected layer, performed by a determination unit; and expanding the layer satisfying the predetermined expansion condition to a predetermined size and generating an effect cut from a combination of the expanded layer to which the predetermined effect is applied and another layer, performed by a controller.

The determining of the layer satisfying the predetermined expansion condition may include determining, as the layer satisfying the predetermined expansion condition, the at least one selected layer having an interface surface which is the same as an interface surface of the cut.

The determining of the layer satisfying the predetermined expansion condition may include determining, as the layer satisfying the predetermined expansion condition, the at least one selected layer, the difference between the interface surface of which and an interface surface of the cut is in a predetermined range.

The expanding of the layer satisfying the predetermined expansion condition and the generating of the effect cut may include adjusting a degree to which the layer satisfying the predetermined expansion condition is to be expanded, based on a direction in and a degree to which the predetermined effect is to be applied, which are indicated in the effect application signal.

The method may further include setting the expanded layer to be restored to an original size thereof after displaying of the effect cut ends, performed by the controller.

According to one or more exemplary embodiments, there is provided a computer program for performing the above method and other different systems methods.

BRIEF DESCRIPTION OF THE DRAWINGS

These and/or other aspects will become apparent and more readily appreciated from the following description of the embodiments, taken in conjunction with the accompanying drawings in which:

FIGS. 7, 8A-8E, 9A-9C, 10A-10C, 11A-11D and 12A-12D illustrate examples of a screen related to information provided from a cartoon data generating system to a user terminal according to exemplary embodiments.

DETAILED DESCRIPTION

Figure 1:
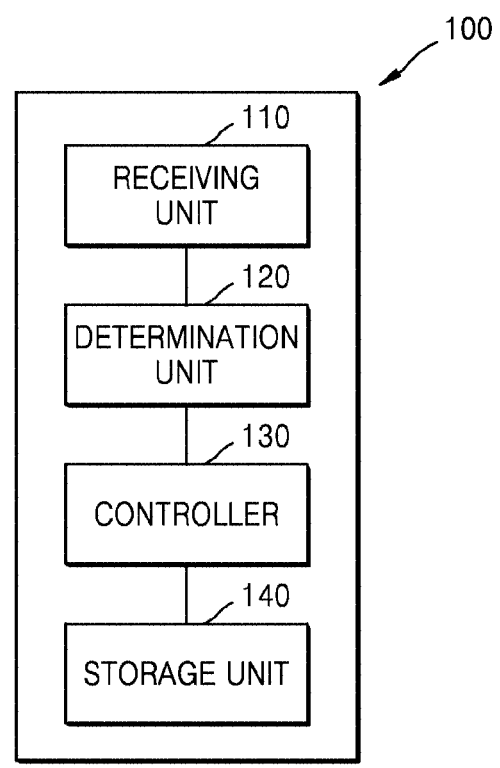
FIG. 1 is a schematic diagram of the structure of a cartoon data generating system according to an exemplary embodiment.

Reference will now be made in detail to embodiments of the present invention, examples of which are illustrated in the accompanying drawings. In this regard, the present embodiments may have different forms and should not be construed as being limited to the descriptions set forth herein. It would be obvious to those of ordinary skill in the art that the above exemplary embodiments are to cover all modifications, equivalents, and alternatives falling within the scope of the inventive concept. The exemplary embodiments set forth herein are provided so that this disclosure will be thorough and complete and will fully convey the inventive concept to those of ordinary skill in the art. In the following description, well-known functions or constructions are not described in detail if it is determined that they would obscure the inventive concept due to unnecessary detail.

The specific terms used in the present disclosure are not intended to restrict the scope of the inventive concept and are only used for a better understanding of exemplary embodiments of the inventive concept. As used herein, the singular forms "a," "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. In the following exemplary embodiments, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

As used herein, the term "and/or" includes any and all combinations of one or more of the associated listed items. Expressions such as "at least one of," when preceding a list of elements, modify the entire list of elements and do not modify the individual elements of the list.

In the present disclosure, the term "cartoon data" means data created by a cartoonist and may include the amount of cartoon data to be provided as one episode. A piece of the cartoon data may include at least one cut. Here, the term "cut" means data containing one scene, and may include at least one layer including an image or text. In cartoon data, each of cuts may be individually included in the form of an image file. The cartoon data may be classified according to authors, episodes, works, days of the week, etc. and may include works that are not published any longer. In the cartoon data, a first cut to a last cut may be displayed within one page or may be divided and displayed on a plurality of pages. The term "display region" should be understood to include a display region of a user terminal, on which all of or some of pieces of cartoon data are displayed.

In the present disclosure, the term "effect" should be understood to include a function of artificially generating a realistic atmosphere appropriate for a cartoon data cut, which is created by a cartoonist, by using sound or an image. The effect may be applied to the entire cartoon data, at least one cut, and/or at least one layer. In the present disclosure, for convenience of explanation, it is assumed that an effect is applied to a layer of a cut. Examples of the effect may be classified into a basic effect, a complex effect, a reproduction effect, a group effect, a cut effect, etc. according to their functions.

Examples of the basic effect may include a first basic effect of moving at least one layer in a cut, a second basic effect of rotating at least one layer in a cut, a third basic effect of increasing/decreasing the size of at least one layer in a cut, a fourth basic effect of adjusting the transparency of at least one layer in a cut, etc.

Examples of the complex effect may include a first complex effect of bringing at least one layer to appear in a cut, a second complex effect of bringing at least one layer to disappear in a cut, etc. Here, times for the first and second complex effects may be set, such that a layer appears or disappears according to the set times.

Examples of the reproduction effect may include a first reproduction effect of visibly shaking or moving at least one layer in a cut in a vertical direction, a horizontal direction, and/or the vertical and horizontal directions relative to a fixed display screen on a user terminal, a second reproduction effect of buoyantly floating at least one layer in a cut, a third reproduction effect of causing at least one layer to shine in a cut, a fourth reproduction effect of adding a sound effect to at least one layer in a cut, a fifth reproduction effect of adding a vibration effect to at least one layer in a cut by using a vibration device of a user terminal displaying cartoon data, etc. The fourth reproduction effect may generate a sound effect using a speaker of a user terminal displaying cartoon data. In the present embodiment, the term "effect" should be understood to include the first reproduction effect of the reproduction effect.

The group effect is expressed using at least two layers in a cut, and may include a first group effect of adding a three-dimensional (3D) effect to cartoon data using a binocular disparity between at least two layers, a second group effect of rendering multiple perspectives via at least two layers, a third group effect of expressing at least two layers to display a picture such that the picture appears to be moving, etc.

Examples of the cut effect may include a first cut effect of setting background music for at least one cut.

Hereinafter, exemplary embodiments will be described in detail with reference to the accompanying drawings, in which like reference numerals refer to like elements throughout and are not redundantly described here.

FIG. 1 is a schematic diagram of the structure of a cartoon data generating system 100 according to an exemplary embodiment. Referring to FIG. 1, the cartoon data generating system 100 includes a receiving unit 110, a determination unit 120, and a controller 130.

The receiving unit 110 may receive a layer selection signal for selecting at least one layer from cartoon data including a cut generated from a combination of at least one layer having different stories, and an effect application signal for applying a predetermined effect to a selected layer. Here, the "effect" should be understood to include the first reproduction effect described above, and will be thus hereinafter described as the first reproduction effect. The layer selection signal and the effect application signal are received from user terminals T1, T2, T3, . . . Tn shown in FIG. 2.

The "at least one layer having different stories" may be understood, such that, for example, when cartoon data of one cut is displayed using a combination of first to fourth layers, the first layer may contain a story expressing cloud, the second layer may contain a story expressing a mountain, the third layer may contain a story expressing a house, and the fourth layer may contain a story expressing water. Cartoon data of one cut may be created from a combination of the first to fourth layers.

The "layer selection signal" may be understood to include a signal for selecting at least one layer from a cut, which is generated from at least one layer, on a user terminal through a user's manipulation so as to apply the first reproduction effect.

The "first reproduction effect application signal" may be understood to include an execution signal selected on a user terminal through a user's manipulation so as to apply the first reproduction effect to a selected layer.

According to an alternative exemplary embodiment, the receiving unit 110 may receive a first reproduction effect application direction setting signal and/or a first reproduction effect application degree setting signal according to a user's manipulation before the first reproduction effect application signal is received. Here, the expression "direction setting" may be understood to include setting a direction in which the first reproduction effect is to be applied to a selected layer. For example, a vertical direction, a horizontal direction, or the vertical and horizontal directions may be set as the direction in which the first reproduction effect is to be applied. The expression "degree setting" may be understood to include setting a degree, i.e., the extent, to which the first reproduction effect is to be applied to a selected layer. For example, the degree to which the first reproduction effect is to be applied may be set to be very low, low, normal, high, or very high.

When the direction in which the first reproduction effect is to be applied to a selected layer is the horizontal direction and the degree to which the first reproduction effect is to be applied is set to be normal, the first reproduction effect may be applied to move the selected layer by, for example, 30 pixels in the horizontal direction with respect to a cut. Similarly, when the direction in which the first reproduction effect is to be applied to the selected layer is the horizontal direction and the degree to which the first reproduction effect is to be applied is set to be low, very low, high, or very high, the first reproduction effect may be applied to move the selected layer by 20, 10, 40, 50 pixels in the horizontal direction with respect to the cut.

When the direction in which the first reproduction effect is to be applied to the selected layer is the vertical direction and the degree to which the first reproduction effect is to be applied is set to be normal, the first reproduction effect may be applied to move the selected layer, for example, by 30 pixels in the vertical direction with respect to the cut. Similarly, when the direction in which the first reproduction effect is to be applied to the selected layer is the vertical direction and the degree to which the first reproduction effect is to be applied is set to be low, very low, high, or very high, the first reproduction effect may be applied to move the selected layer, for example, by 20, 10, 40, or 50 pixels in the vertical direction with respect to the cut.

When the direction in which the first reproduction effect is to be applied to the selected layer is the vertical and horizontal directions and the degree to which the first reproduction effect is to be applied is set to be normal, the first reproduction effect may be applied to move the selected layer, for example, by 30 pixels in the vertical and horizontal directions with respect to the cut. Similarly, when the direction in which the first reproduction effect is to be applied to the selected layer is the vertical and horizontal directions and the degree to which the first reproduction effect is to be applied is set to be low, very low, high, or very high, the first reproduction effect may be applied to move the selected layer, for example, by 20, 10, 40, or 50 pixels in the vertical and horizontal directions with respect to the cut.

According to an alternative exemplary embodiment, before the first reproduction effect application signal is received, the receiving unit 110 may receive not only the first reproduction effect application direction setting signal and/or the first reproduction effect application degree setting signal but also at least one among a first reproduction effect application time (e.g., time when a selected layer appears on screen, time when a cut starts, simultaneously with a previous effect, after the previous effect ends, etc.) setting signal, a first effect application speed (e.g., very slow, slow, normal, fast, very fast, etc.) setting signal, a first effect application delay (e.g., none, very short, short, normal, long, very long, etc.) setting signal, a first effect repetitive application number (e.g., limitless, 1, 2, 3, 4, 5, etc.) setting signal, etc. according to a user's manipulation.

The determination unit 120 may determine a layer that satisfies an expansion condition among the at least one layer selected by the receiving unit 110. The reason why the expansion condition is set will be described below. When the first reproduction effect is applied to a selected layer, the selected layer may shake with respect to a canvas according to the degree to and the direction in which the first reproduction effect is to be applied, which are set while the first reproduction effect is applied. In this case, while the selected layer shakes according to the set direction and degree, a layer that is included in a cut but is not selected may be partially exposed. Thus, cartoon data to which the first reproduction effect is actually applied may be unnaturally displayed or appear disjointed (see, e.g., FIGS. 10A-10B). Thus, in order to prevent the cartoon data from being unnaturally displayed, the determination unit 120 may determine a layer that satisfies the expansion condition, and the controller 130 may expand the determined layer and apply the first reproduction effect to the expanded layer. Here, the term "canvas" may be understood to include a display region which is a base for generating a cut and/or layer of the cartoon data. A user may draw a desired cut on the canvas. Since the size of the canvas is equal to that of the cut, a selected layer that shakes with respect to the cut and that a selected layer that shakes with respect to the canvas are considered to be the same.

The expansion condition may be understood to include a condition of determining a selected layer that causes cartoon data to be unnaturally displayed. The expansion condition may include a first expansion condition and a second expansion condition.

The first expansion condition may be understood to include a case in which an interface surface, i.e., an edge, of a layer selected to correspond to the direction in which the first reproduction effect is to be applied and an interface surface or edge of a cartoon data cut are the same in a state in which the direction in which the first reproduction effect is to be applied is set to apply the first reproduction effect. For example, if the direction in which the first reproduction effect is to be applied is the horizontal direction, the determination unit 120 may determine a selected layer as a layer satisfying the first expansion condition when horizontal interface surfaces of the selected layer and the cartoon data cut are the same. When the layer satisfying the first expansion condition is not expanded, a layer that is included in the cut but is not selected may be partially exposed while the selected layer is moved in the horizontal direction with respect to the cut, thereby causing the cartoon data from being unnaturally displayed. Thus, after the layer satisfying the first expansion condition is determined, the layer may be expanded and then the first reproduction effect may be applied to the expanded layer, thereby naturally displaying the cartoon data.

Similarly, if the direction in which the first reproduction effect is to be applied is the vertical direction, the determination unit 120 may determine a selected layer as a layer satisfying the first expansion condition when vertical interface surfaces of the selected layer and the cartoon data cut are the same. If the direction in which the first reproduction effect is to be applied is the vertical and horizontal directions, the determination unit 120 may determine a selected layer as a layer satisfying the first expansion condition when the vertical and horizontal interface surfaces of the selected layer and the vertical and horizontal interface surfaces of the cartoon data cut are the same.

The second expansion condition may be understood to include a case in which the difference between an interface surface of a layer selected to correspond to the direction in which the first reproduction effect is to be applied and an interface surface of a cartoon data cut is in a predetermined range, in a state in which the direction in which the first reproduction effect is to be applied is set to apply the first reproduction effect. In general, although interface surfaces of a cut and a layer should be exactly the same, the interface surfaces of the cut and the layer may become different due to a user's mistake. Thus, the second expansion condition may be set to apply the first reproduction effect even to a selected layer such that the difference between the interface surface of the selected layer and the interface surface of the cut is in the predetermined range. Here, the predetermined range may be understood to include a range (for example, 5 pixels or more) in which this difference is not detected when cartoon data is displayed. The determination unit 120 may determine a selected layer as a layer satisfying the second expansion condition when the difference between interface surfaces of the selected layer and the cartoon data cut is in the predetermined range.

For example, the determination unit 120 may determine a selected layer as a layer satisfying the second expansion condition when the direction in which the first reproduction effect is to be applied is the horizontal direction and the determination unit 120 determines the difference between the horizontal interface surfaces of the selected layer and the cartoon data cut is three pixels. When the layer satisfying the second expansion condition is not expanded, a layer that is included in the cut but is not selected may be partially exposed while the selected layer is moved in the horizontal direction with respect to the cut, thereby causing the cartoon data to be unnaturally displayed. Thus, after the layer satisfying the second expansion condition is determined, the layer may be expanded and then the second reproduction effect may be applied to the expanded layer, thereby naturally displaying the cartoon data.

Similarly, the determination unit 120 may determine a selected layer as a layer satisfying the second expansion condition when the direction in which the first reproduction effect is to be applied is the vertical direction and the determination unit 120 determines the difference between the vertical interface surfaces of the selected layer and the cartoon data cut is three pixels. Also, the determination unit 120 may determine a selected layer as a layer satisfying the second expansion condition when the direction in which the first reproduction effect is to be applied is the vertical and horizontal directions and the determination unit 120 determines the difference between the vertical and horizontal interface surfaces of the selected layer and the vertical and horizontal interface surfaces of the cartoon data cut is three pixels.

According to an alternative exemplary embodiment, the determination unit 120 may determine a selected layer present in the cut as a layer to which the expansion condition is not to be applied. When the selected layer is present in the cut, the selected layer may be naturally displayed even when the first reproduction effect is applied thereto. Thus, the determination unit 120 may determine the selected layer that is present in the cut as a layer to which the expansion condition is not to be applied. The first reproduction effect may be applied to the original size of the layer to which the expansion condition is not to be applied.

According to an alternative exemplary embodiment, the determination unit 120 may determine, as a layer to which the expansion condition is not to be applied, a layer that does not satisfy the second expansion condition, and a layer in which the difference between an interface surface of the layer selected corresponding to the direction in which the first reproduction effect is to be applied and the interface surface of the cartoon data cut exceeds the predetermined range. Also, the determination unit 120 may determine a layer that is greater than the cut in size as a layer to which the expansion condition is not to be applied.

The controller 130 may provide a user terminal with screen information related to generating cartoon data (see FIGS. 6 to 11), and receive a series of process information related to generating cartoon data from the user terminal via the receiving unit 110. The controller 130 should be understood to include various types of devices capable of processing data, e.g., a processor for controlling overall operations of the cartoon data generating system 100. Here, the processor may be a data processing device embedded in hardware and having a circuit physically constructed to execute, for example, code included in a program or a function expressed in the form of a command. Examples of the data processing device embedded in hardware include, but are not limited to, a microprocessor, a central processing unit (CPU), a processor core, a multiprocessor, an application-specific integrated circuit (ASIC), a field programmable gate array (FPGA), etc. While FIG. 1 shows the receiving unit 110, the determination unit 120 and the controller 130 as being three separate units, they may physically be provided on the same processor on which the controller 130 is implemented. The receiving unit 110 and the determination unit 120 may also be provided on a processor separately from the controller 130. In another embodiment, the receiving unit 110 and the determination unit 120 may be realized as additional operations or functions performed by the controller 130.

The controller 130 may expand a layer satisfying the first or second expansion condition, which is determined by the determination unit 120, to a predetermined size, and generate an effect cut from a combination of the expanded layer to which the first reproduction effect is applied and another layer.

The controller 130 may adjust a degree to which a layer satisfying the first or second expansion condition is to be expanded, according to a first reproduction effect direction setting signal and/or a first reproduction effect degree setting signal received by the receiving unit 110.

For example, if the controller 130 receives, from the receiving unit 110, the first reproduction effect direction setting signal indicating that the direction in which the first reproduction effect is to be applied is a horizontal direction and the first reproduction effect degree setting signal indicating that the degree to which first reproduction effect is to be applied is normal, the controller 130 may expand a layer satisfying the first or second expansion condition such that a layer that is included in a cut but is not selected is not partially exposed, even when the layer satisfying the first or second expansion condition is moved by 30 pixels in the horizontal direction with respect to the cut. Similarly, if the controller 130 receives, from the receiving unit 110, the first reproduction effect direction setting signal indicating that the direction in which the first reproduction effect is to be applied is a horizontal direction and the first reproduction effect degree setting signal indicating that the degree to which first reproduction effect is to be applied is low, very low, high, or very high, the controller 130 may expand the layer satisfying the first or second expansion condition such that a layer that is included in the cut but is not selected is not partially exposed, even when the layer satisfying the first or second expansion condition is moved by 20, 10, 40, or 50 pixels in the horizontal direction with respect to the cut.

For example, if the controller 130 receives, from the receiving unit 110, the first reproduction effect direction setting signal indicating that the direction in which the first reproduction effect is to be applied is a vertical direction and the first reproduction effect degree setting signal indicating that the degree to which first reproduction effect is to be applied is normal, the controller 130 may expand the layer satisfying the first or second expansion condition such that a layer that is included in the cut but is not selected is not partially exposed, even when the layer satisfying the first or second expansion condition is moved by 30 pixels in the vertical direction with respect to the cut. Similarly, if the controller 130 receives, from the receiving unit 110, the first reproduction effect direction setting signal indicating that the direction in which the first reproduction effect is to be applied is a vertical direction and the first reproduction effect degree setting signal indicating that the degree to which first reproduction effect is to be applied is low, very low, high, or very high, the controller 130 may expand the layer satisfying the first or second expansion condition such that a layer that is included in the cut but is not selected is not partially exposed, even when the layer satisfying the first or second expansion condition is moved by 20, 10, 40, or 50 pixels in the vertical direction with respect to the cut.

For example, if the controller 130 receives, from the receiving unit 110, the first reproduction effect direction setting signal indicating that the direction in which the first reproduction effect is to be applied is vertical and horizontal directions and the first reproduction effect degree setting signal indicating that the degree to which first reproduction effect is to be applied is normal, the controller 130 may expand a layer satisfying the first or second expansion condition such that layer that is included in a cut but is not selected is not partially exposed, even when the layer satisfying the first or second expansion condition is moved by 30 pixels in the vertical and horizontal directions with respect to the cut. Similarly, if the controller 130 receives, from the receiving unit 110, the first reproduction effect direction setting signal indicating that the direction in which the first reproduction effect is to be applied is vertical and horizontal directions and the first reproduction effect degree setting signal indicating that the degree to which first reproduction effect is to be applied is low, very low, high, or very high, the controller 130 may expand the layer satisfying the first or second expansion condition such that a layer that is included in the cut but is not selected is not partially exposed, even when the layer satisfying the first or second expansion condition is moved by 20, 10, 40, or 50 pixels in the vertical and horizontal directions with respect to the cut.

The controller 130 may not only apply the first reproduction effect to a layer expanded to a predetermined size but also generate an effect cut from a combination of the expanded layer to which the first reproduction effect is applied and another layer. Here, the applying of the first reproduction effect may be understood to include applying, to the layer expanded to the predetermined size, not only the first reproduction effect direction setting signal and/or the first reproduction effect degree setting signal received from the receiving unit 110 but also at least one among results of setting a point of time when the first reproduction effect is to be applied, a speed of applying the first reproduction effect, a delay time during which application of the first reproduction effect will be delayed, and a number of times that the first reproduction effect is to be repeatedly applied.

According to an alternative exemplary embodiment, the controller 130 may not only apply the first reproduction effect to a layer to which the expansion condition is not to be applied but also generate an effect cut from a combination of the layer to which the first reproduction effect is applied and another layer. According to an alternative exemplary embodiment, the controller 130 may restore the expanded layer to the original size thereof after displaying of the effect cut ends.

The cartoon data generating system 100 may further include a storage unit 140 configured to temporarily or permanently store cartoon data to be processed by the controller 130. The storage unit 140 may be a magnetic storage media or a flash storage media but exemplary embodiments are not limited thereto.

Figure 2:
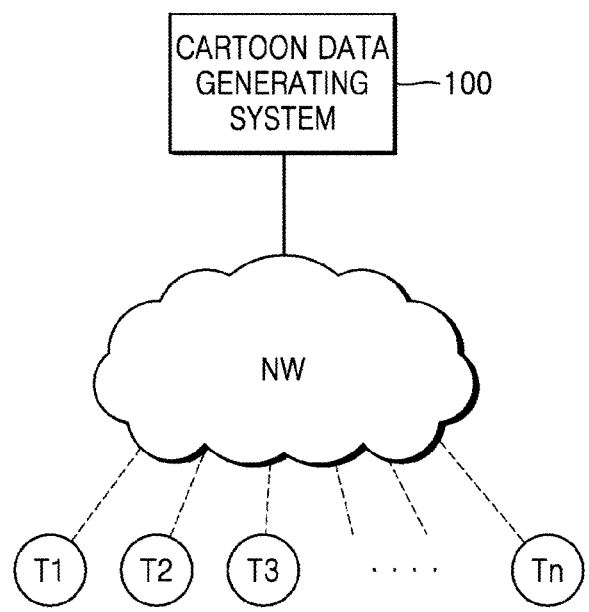
FIG. 2 is a diagram illustrating the relationship between a user terminal and the cartoon data generating system of FIG. 1 according to an exemplary embodiment.

FIG. 2 is a diagram illustrating the relationship between a user terminal and the cartoon data generating system 100 of FIG. 1 according to an exemplary embodiment. Referring to FIG. 2, the cartoon data generating system 100 may be connected to a plurality of user terminals T1, T2, T3, . . . , Tn via a network NW including a communication network. Here, examples of the communication network may include wire networks (e.g., local-area networks (LANs), wide-area networks (WANs), metropolitan area networks (MANs), integrated service digital networks (ISDNs), etc.) and wireless networks (e.g., wireless LANs, CDMA, Bluetooth, satellite network, etc.), but exemplary embodiments are not limited thereto. Alternatively, the communication network may be a device including hardware and software needed to exchange signals, such as a control signal or a data signal, with other network devices while being connected to the other network devices in a wired/wireless manner. The cartoon data generating system 100 described above is differentiated from the user terminal T1, T2, T3, . . . , Tn, and connected to the user terminals T1, T2, T3, . . . , Tn via the network NW while being separated from the user terminal T1, T2, T3, . . . , Tn.

Figure 3:
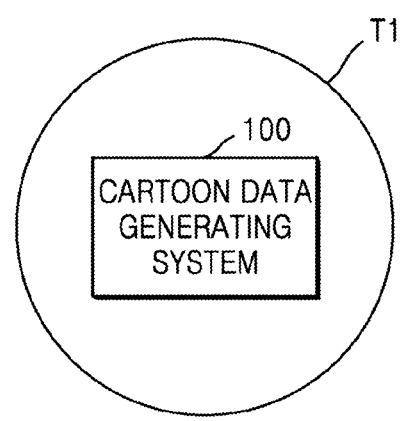
FIG. 3 is a diagram illustrating the relationship between a user terminal and the cartoon data generating system of FIG. 1 according to another exemplary embodiment.

FIG. 3 is a diagram illustrating the relationship between a user terminal and the cartoon data generating system 100 of FIG. 1 according to another exemplary embodiment. Referring to FIG. 3, the cartoon data generating system 100 may be included in a user terminal T1. Although not shown, the cartoon data generating system 100 may be included in each of user terminals. The cartoon data generating system 100 according to the present embodiment may be included in the user terminal T1 according to various methods. In detail, according to an exemplary embodiment, users may install the cartoon data generating system 100 in their own terminals via the network NW. For example, the cartoon data generating system 100 may be installed in the user terminal T1 in the form of an application. According to another exemplary embodiment, the cartoon data generating system 100 may be installed in the user terminal T1 off-line. However, these exemplary embodiments are just examples and the inventive concept is not limited thereto. The cartoon data generating system 100 may be installed in the user terminal T1 in various forms.

Figure 4:
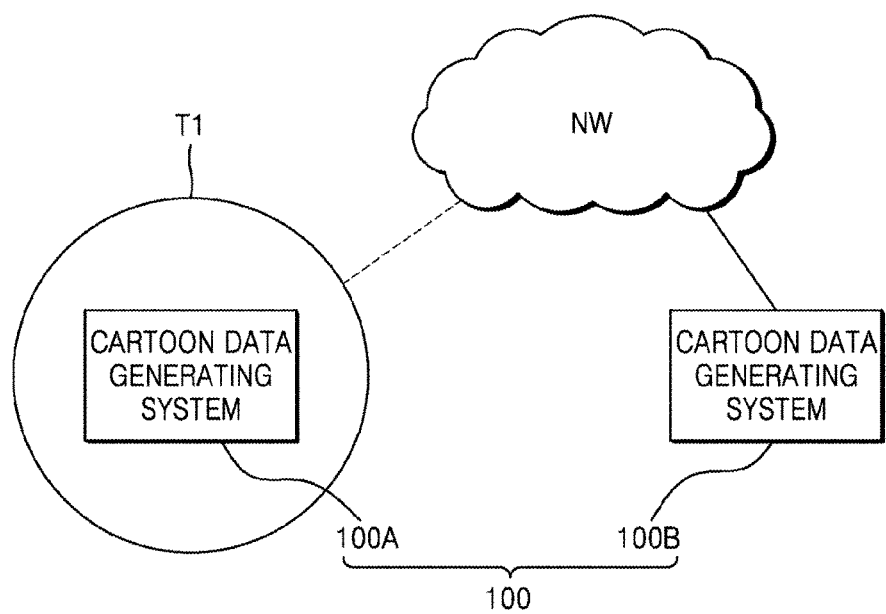
FIG. 4 is a diagram illustrating the relationship between a user terminal and the cartoon data generating system of FIG. 1 according to another exemplary embodiment.

FIG. 4 is a diagram illustrating the relationship between a user terminal and the cartoon data generating system 100 of FIG. 1 according to another exemplary embodiment. Referring to FIG. 4, one portion 100A of the cartoon data generating system 100 may be included in a user terminal T1 and another portion 100B of the cartoon data generating system 100 may be connected to the user terminal T1 via a network NW.

For example, the portion 100A of the cartoon data generating system 100 that includes the receiving unit 110 among the components of the cartoon data generating system 100 illustrated in FIG. 1 may be included in the user terminal T1. A method of including the other portion 100B of the cartoon data generating system 100 in the user terminal T1 is as described above with reference to the embodiment of FIG. 3 and is thus not described again here. The other portion 100B of the cartoon data generating system 100 that includes the determination unit 120 and the controller 130 among the components of the cartoon data generating system 100 illustrated in FIG. 1 may be connected to the user terminal T1 via the network NW.

Although a case in which the other portion 100B of the cartoon data generating system 100 that includes the determination unit 120 and the controller 130 is connected to the user terminal T1 via the network NW is described above in the present embodiment, exemplary embodiments are not limited thereto. That is, at least one among a plurality of components included in the cartoon data generating system 100 may be selectively connected to the user terminal T1 via the network NW.

Figure 5:
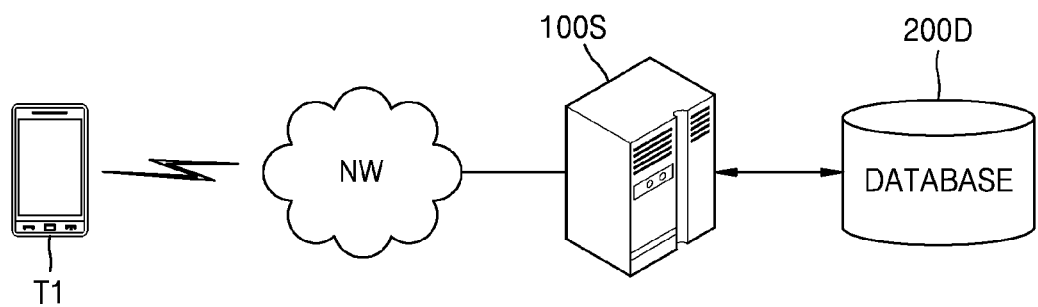
FIG. 5 is a schematic diagram illustrating the structure of a cartoon data generating system according to another exemplary embodiment.

FIG. 5 is a schematic diagram illustrating the structure of a cartoon data generating system according to another exemplary embodiment. In the following description, a part of the cartoon data generating system that is the same as that of the cartoon data generating system described above with reference to FIGS. 1 to 4 is not redundantly described again here. Referring to FIG. 5, the cartoon data generating system 100 may be embodied as a cartoon data generation server 100S and a user terminal T1 may be connected to the cartoon data generation server 100S via a network NW. The cartoon data generation server 100S may store information for processing cartoon data received from the user terminal T1 in a database 200D or provide cartoon data stored in the database 200D to the user terminal T1.

The user terminal T1 is a device capable of accessing the cartoon data generation server 100S via the network NW, and may include a computer (e.g., a desktop computer, a laptop computer, a tablet PC, etc.), a media computing platform (e.g., a cable, a satellite set-top box, a digital video recorder, etc.), a handheld computing device (e.g., a PDA, an email client, etc.), any type of a mobile phone, or other types of computing or communication platforms, but exemplary embodiments are not limited thereto.

The user terminal T1 may access the cartoon data generation server 100S to receive screen information related to generating cartoon data, and transmit process information related to generating cartoon data to the cartoon data display server 100S.

The database 200D may store at least one cut that constitutes cartoon data and at least one layer that constitutes a cut.

The cartoon data display server 100S may receive, from the user terminal T1, a layer selection signal for selecting at least one layer included in a cartoon data cut and a first reproduction effect application signal for applying the first reproduction effect to the at least one selected layer. The cartoon data display server 100S may receive, from the user terminal T1, a first reproduction effect application direction setting signal and/or a first reproduction effect application degree setting signal which are included in the first reproduction effect application signal, and at least one signal among a first reproduction effect application time (e.g., time when a selected layer appears on a screen, time when a cut starts, etc.) setting signal, a first effect application speed (e.g., very slow, slow, normal, fast, very fast, etc.) setting signal, a first effect application delay (e.g., none, very short, short, normal, long, very long, etc.) setting signal, a first effect repetitive application number (limitless, 1, 2, 3, 4, 5, etc.) setting signal, etc.

When the layer selection signal and the first reproduction effect application signal are received from the user terminal T1, the cartoon data display server 100S may determine a layer that satisfies the expansion condition with respect to a selected layer. Here, the expansion condition may include a condition of determining a layer that may cause cartoon data from being unnaturally displayed, and include the first expansion condition and the second expansion condition. The first expansion condition may be understood to include a case in which an interface surface of a layer selected to correspond to a direction in which the first reproduction effect is to be applied and an interface surface of a cartoon data cut are the same, in a state in which the direction in which the first reproduction effect is to be applied is set to apply the first reproduction effect. The second expansion condition may be understood to include a case in which the difference between an interface surface of a layer selected to correspond to a direction in which the first reproduction effect is to be applied and an interface surface of a cartoon data cut is in a predetermined range, in a state in which the direction in which the first reproduction effect is to be applied is set to apply the first reproduction effect. The cartoon data display server 100S may determine, as a layer to which the expansion condition is not to be applied, a selected layer included in a cut, a layer corresponding to the direction in which the first reproduction effect is to be applied, or a layer that is greater than the cut in size. Further, the cartoon data display server 100S may determine, as a layer to which the expansion condition is not to be applied, a layer that does not satisfy the second expansion condition, and a layer in which the difference between an interface surface of the layer selected corresponding to the direction in which the first reproduction effect is to be applied and the interface surface of the cartoon data cut exceeds the predetermined range.

The cartoon data display server 100S may expand a layer satisfying the expansion condition to a predetermined size, and generate an effect cut from a combination of the expanded layer to which the first reproduction effect is applied and another layer. Here, the applying of the first reproduction effect may be understood to include applying, to the layer expanded to the predetermined size, not only the first reproduction effect direction setting signal and/or the first reproduction effect degree setting signal which are received from the receiving unit 110 but also at least one among results of setting a point of time when the first reproduction effect is to be applied, a speed of applying the first reproduction effect, a delay time during which application of the first reproduction effect will be delayed, and a number of times that the first reproduction effect is to be repeatedly applied. The cartoon data display server 100S may adjust a degree to which a layer satisfying the expansion condition is to be expanded, according to the first reproduction effect direction setting signal and/or the first reproduction effect degree setting signal. The cartoon data display server 100S may not only apply the first reproduction effect to a layer to which the expansion condition is not to be applied but also generate an effect cut from a combination of the layer to which the first reproduction effect is applied but the expansion condition is not to be applied and another layer. The cartoon data display server 100S may restore the expanded layer to the original size thereof after displaying of the effect cut ends.

Figure 6:
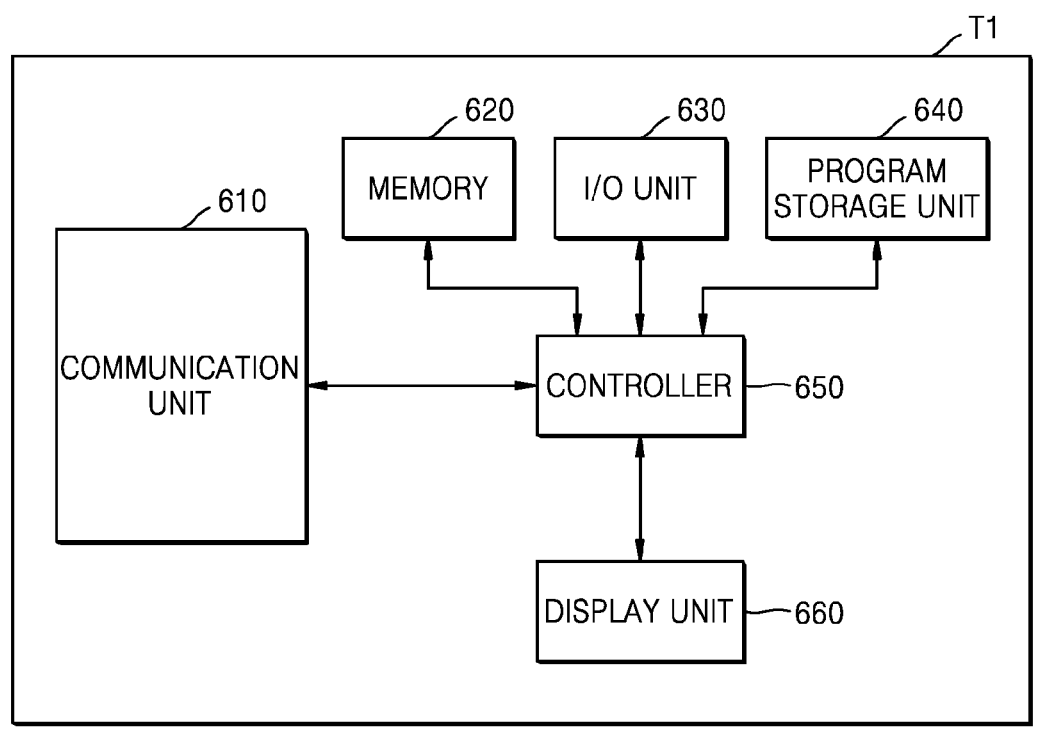
FIG. 6 is a schematic block diagram of the structure of a user terminal according to an exemplary embodiment.

FIG. 6 is a schematic block diagram of the structure of a user terminal T1 according to an exemplary embodiment. Referring to FIG. 6, the user terminal T1 includes a communication unit 610, a memory 620, an input/output (I/O) unit 630, a program storage unit 640, a controller 650, and a display unit 660.

The communication unit 610 may be a device including hardware and software needed to exchange a signal, such as a control signal or a data signal, with a different network device similar to the cartoon data generating system 100 while being connected to the different network device in a wired/wireless manner. For example, the communication unit 610 may include a short-distance wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, a ultra-wideband (UWB) communication unit, an Ant+ communication unit, etc. The mobile communication unit exchanges a radio signal with at least one among a base station, an external terminal, and a server in a mobile communication network. The radio signal may include a voice call signal, a video communication call signal, or various types of data exchanged by receiving/transmitting a text/multimedia message.

The memory 620 may temporarily or permanently store data to be processed by the controller 650 or content data transmitted to the user terminal T1. The memory 620 may include a magnetic storage media or a flash storage media but exemplary embodiments are not limited thereto.

The I/O unit 630 may be a touch-recognition display controller or other various types of I/O controller. For example, the touch-recognition display controller may provide an output interface and an input interface between a device and a user. The touch-recognition display controller may exchange an electrical signal with the controller 650. Also, the touch-recognition display controller displays a visual output to a user. Examples of the visual output may include a text, a graphic, an image, video, and a combination thereof. The I/O unit 130 may be, for example, a display member such as an organic light emitting display (OLED) or a liquid crystal display (LCD) having a touch recognition function.

The program storage unit 640 may store control software for receiving a first reproduction effect application signal for applying the first reproduction effect to the at least one selected layer; determining a layer satisfying the expansion condition among the at least one selected layer; expanding the layer satisfying the expansion condition to a predetermined size; generating a first reproduction effect cut from a combination of the expanded layer to which the first reproduction effect is applied and another layer, etc.

The controller 650 is a type of a CPU and may control an entire process of downloading contents from the user terminal T1. That is, the controller 650 may drive the control software stored in the program storage unit 640; control the display unit 660 to display, on the user terminal T1, at least one layer selected from cartoon data including a cut, which is generated from a combination of at least one layer, according to the layer selection signal; expand a layer satisfying the expansion condition to a predetermined size among the at least one selected layer according to the first reproduction effect application signal for applying the first reproduction effect to the at least one selected layer; and display a first reproduction effect cut generated from a combination of the expanded layer to which the first reproduction effect is applied and another layer. Also, the controller 650 may adjust a degree to which the layer satisfying the expansion condition is to be expanded, based on a direction in and a degree to which the first reproduction effect is to be applied, which are indicated in the first reproduction effect application signal; and set the expanded layer to be restored to the original size thereof after the displaying of the first reproduction effect cut ends.

The controller 650 should be understood to include various types of devices capable of processing data, e.g., a processor. Here, the processor may be a data processing device embedded in hardware and having a circuit physically constructed to execute, for example, code included in a program or a function expressed in the form of a command. Examples of the data processing device embedded in hardware include, but are not limited to, a microprocessor, a CPU, a processor core, a multiprocessor, an ASIC, a FPGA, etc.

The display unit 660 may display cartoon data including a cut generated from a combination of at least one layer by using the cartoon data generating system 100; display at least one layer selected from the cartoon data according to a layer selection signal; and display a first reproduction effect cut generated from a combination of an expanded layer (which is obtained by expanding a layer satisfying the expansion condition among selected layers processed by the controller 650 according to a first reproduction effect application signal for applying the first reproduction effect to the at least one selected layer) and another layer, under control of the controller 650.

Figure 7:
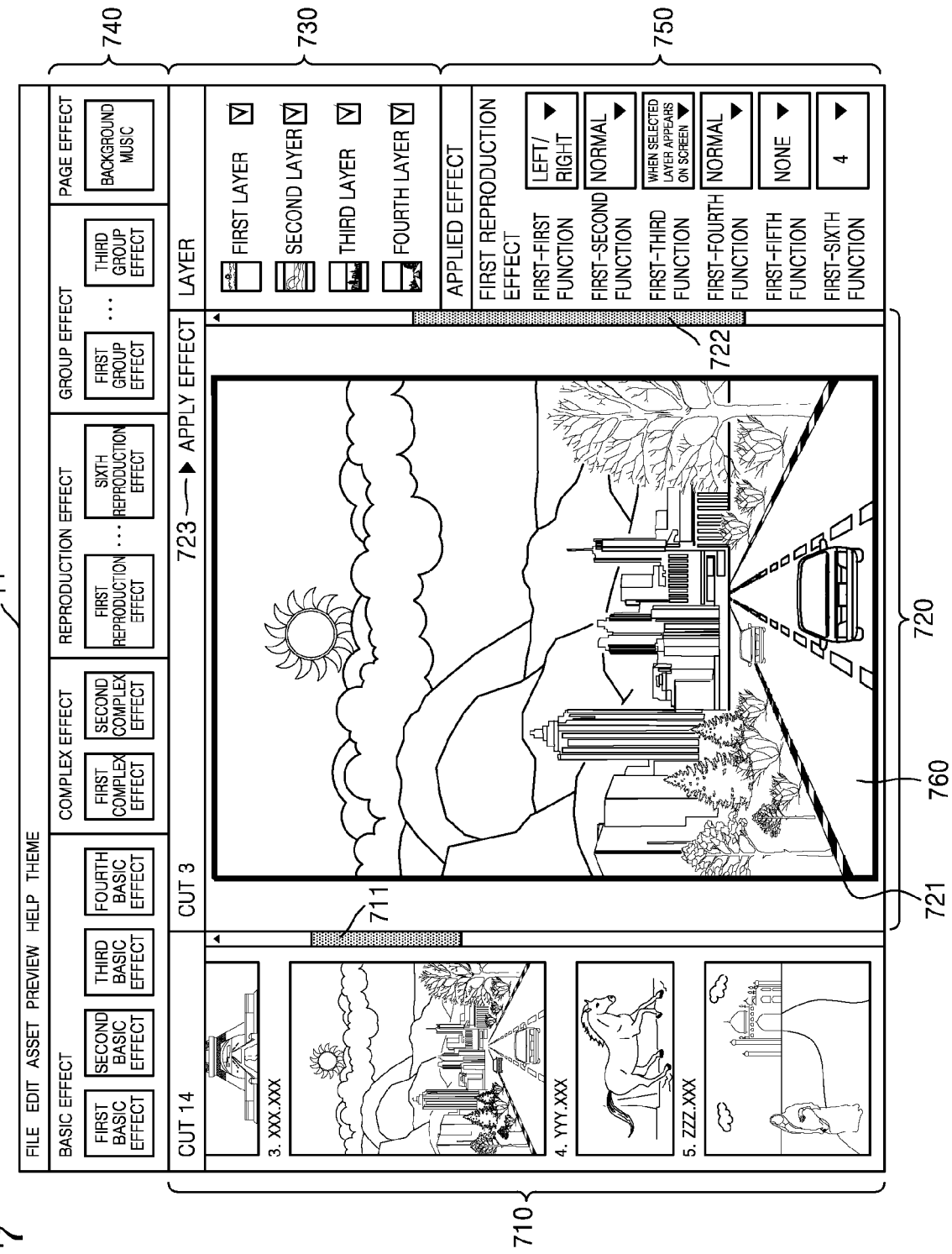

FIG. 7 illustrates a cartoon data generation screen provided from the cartoon data generating system 100 of FIG. 1 to a user terminal T1 according to an exemplary embodiment. Referring to FIG. 7, the cartoon data generation screen displayed on the user terminal T1 may include a first display region 710 to a fifth display region 750.

In the first display region 710, at least one cut of cartoon data may be displayed in a first size. Referring to FIG. 7, for example, a total of fourteen cuts are displayed in the first display region 710. By manipulating a first scroll bar 711, the total of fourteen cuts may be viewed from a start cut to an end cut.

In the second display region 720, a cut selected in the first display region 710 may be displayed on a canvas 721. The canvas 721 may have a second size which is greater than the first size. FIG. 7 illustrates a case in which a third cut 760 among the total of fourteen cuts is selected and displayed on the canvas 721. When the third cut 760 is not in a visual range on the canvas 721, the visual range of third cut 760 may be moved by manipulating a second scroll bar 722. After at least one effect is set for the third cut 760 displayed on the canvas 721, the set at least one effect may be previewed when an effect application key 723 is selected.

In the third display region 730, at least one layer that constitutes the third cut 760 is displayed. Here, the at least one layer may be displayed on the canvas 721 in a third size (e.g., a size of a thumbnail) which is smaller than the first size. FIG. 7 illustrates a case in which first to fourth layers each having the third size of the third cut 760 are displayed. When a layer is selected in the third display region 730, the selected layer may be displayed on the canvas 721 in the second display region 720. For example, when all of the at least one layer of the third display region 730 is selected, the whole third cut 760 may be displayed on the canvas 721 in the second display region 720. When two layers are selected in the third display region 730, the two layers may be simultaneously displayed on the canvas 721 in the second display region 720.

In the fourth display region 740, at least one effect applicable to the at least one layer displayed on the canvas 721 of the second display region 720 is displayed. The at least one effect may include the basic effect, the complex effect, the reproduction effect, the group effect, the cut effect, etc. as described above.

In the fifth display region 750, detailed setting functions of a selected effect are displayed. Although FIG. 7 illustrates detailed setting functions of the first reproduction effect, exemplary embodiments are not limited thereto and detailed setting functions of at least one set effect may be displayed. In the fifth display region 750, a first-first function to a first-sixth function are displayed as detailed setting functions of the first reproduction effect and may be set by a user. Through the first-first function, a direction in which the first reproduction effect is to be applied may be set as a horizontal direction, a vertical direction, or horizontal and vertical directions. Through the first-second function, a degree to which the first reproduction effect is to be applied may be set as very low, low, normal, strong, or very strong. Through the first-third function, time when the first reproduction effect is to be applied may be set as when a selected layer appears on a screen, when a cut starts, simultaneously with a previous effect, or after the previous effect ends. Through the first-fourth function, a speed at which the first reproduction effect is to be applied may be set as very slow, slow, normal, fast, or very fast. Through the first-fifth function, a duration for which the first reproduction effect is to be delayed may be set as very short, short, normal, long, very long, or none. Through the first-sixth function, a number of times that the first reproduction effect is to be repeatedly applied may be set <1>, <2>, <3>, <4>, <5>, or limitless.

A process of displaying a cut to which the first reproduction effect is applied will be described with reference to FIG. 7 below. A user selects a cut to which the first reproduction effect is to be applied from the first display region 710 by manipulating the first scroll bar 711 on the user terminal T1. After the cut to which the first reproduction effect is to be applied is selected, the cartoon data generating system 100 displays the selected cut, e.g., the third cut 760, on the canvas 721 of the second display region 720. Also, the cartoon data generating system 100 displays the first to fourth layers each having the third size and constituting the third cut 760 in the third display region 730. The user selects at least one layer to which the first reproduction effect is to be applied, e.g., the third layer, from the third display region 730. After the third layer is selected, the cartoon data generating system 100 displays the third layer on the canvas 721 of the second display region 720. The user selects the first reproduction effect to be applied to the third layer from the fourth display region 740. After the first reproduction effect is selected, the cartoon data generating system 100 displays, on the fifth display region 750, the first-first function to the first-sixth function for setting particular functions of the first reproduction effect. The user sets the first-first function to the first-sixth function on the fifth display region 750. After the first-first function to the first-sixth function are set, when the user selects the effect application key 723 included in the second display region 720, the cartoon data generating system 100 displays an effect cut generated from a combination of the third layer to which the first reproduction effect is applied and another layer.

Figure 8C:
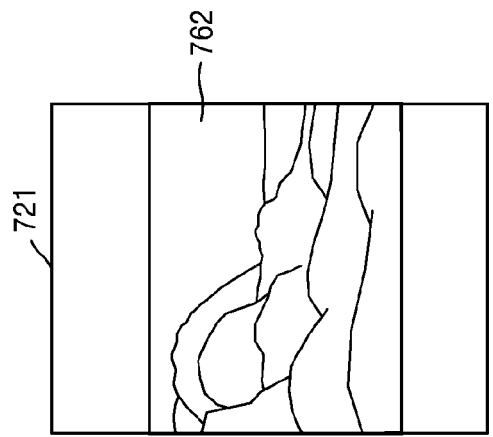
Figure 8E:
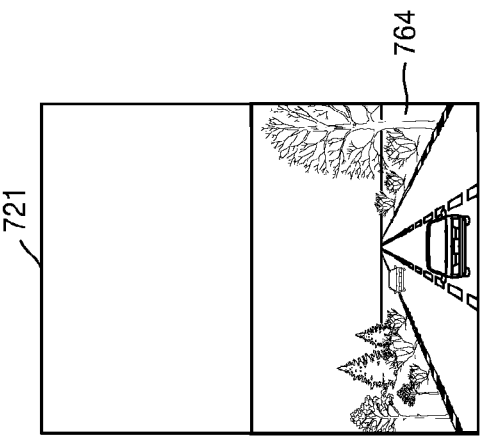
Figure 8B:
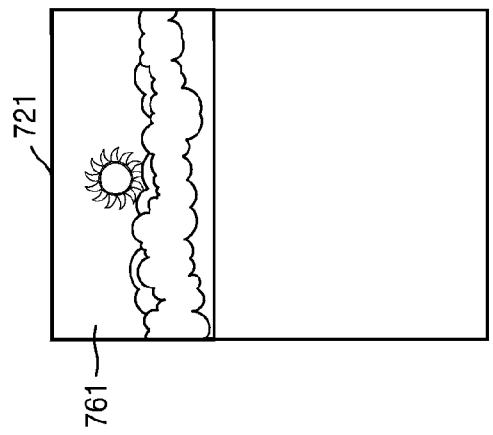
Figure 8D:
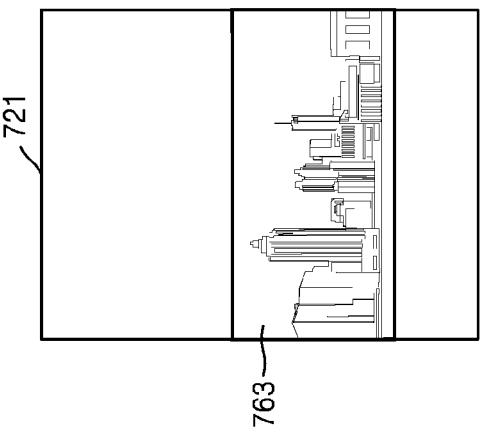
Figure 8A:
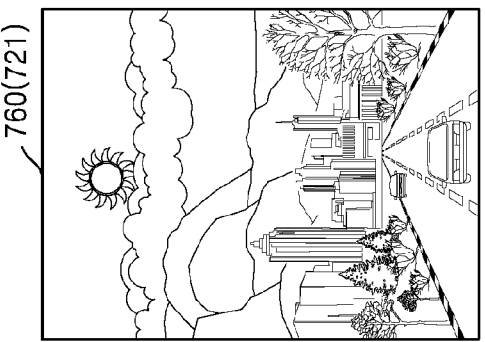

FIGS. 8A-8E illustrate a plurality of layers included in a cut of cartoon data provided to the user terminal T1 of FIG. 6 from the cartoon data generating system 100, according to an exemplary embodiment. FIG. 8A illustrates a third cut 760 displayed on a canvas 721. FIGS. 8B to 8E respectively illustrate cases in which a first layer 761 to a fourth layer 764 that constitute the third cut 760 are displayed on the canvas 721.

FIGS. 9A-9C and 10A-10C illustrate screens to which a first reproduction effect according to the related art is applied. Here, it is assumed that a third layer 763 of the third cut 760 illustrated in FIGS. 7 and 8D is selected as a layer to which the first reproduction effect is to be applied, a direction in which the first reproduction effect is to be applied is set to be a horizontal direction, and a degree to which the first reproduction effect is to be applied is set to be normal.

FIGS. 9A-9C illustrate a screen in which the first reproduction effect is applied to the third layer 763 according to the related art. FIG. 9A illustrates the third layer 763 displayed on a canvas 721. FIGS. 9B and 9C illustrate a result of applying the first reproduction effect of shaking the third layer 763 with respect to the canvas 721 in the horizontal direction. As illustrated in FIGS. 9B and 9C, the canvas 721 in the horizontal direction next to the third layer 763 is partially exposed when the first reproduction effect of shaking the third layer 763 in the horizontal direction is applied.

Figure 10A:
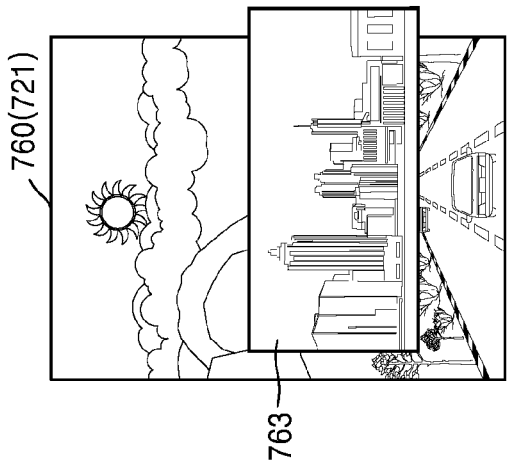
Figure 10B:
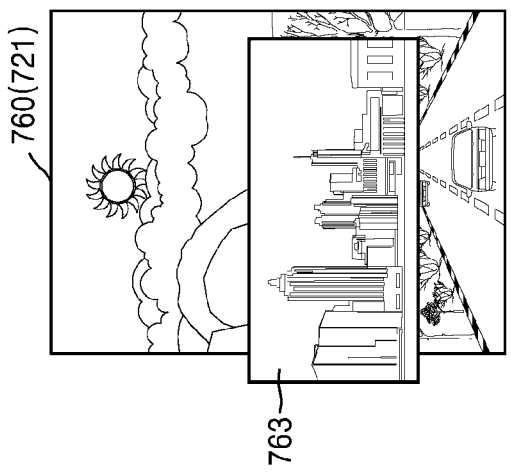
Figure 10C:
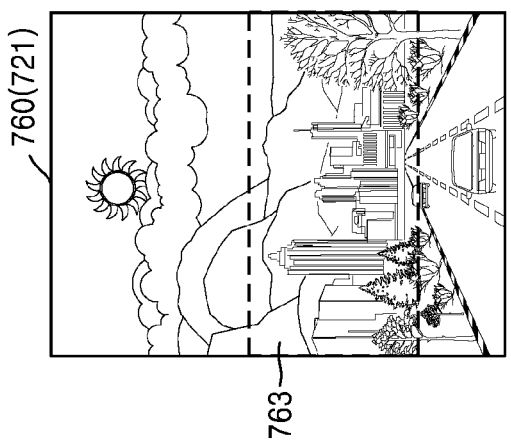

FIGS. 10A-10C illustrate a screen in which the first reproduction effect is applied to the entire third cut 760 according to the related art. FIG. 10A illustrates the third cut 760 displayed on a canvas 721. Here, the size of the canvas 721 is the same as that of the third cut 760. FIGS. 10B and 10C illustrate a result of applying the first reproduction effect of shaking the third layer 763 with respect to the third cut 760 in the horizontal direction. As illustrated in FIGS. 10B and 10C, when the first reproduction effect of shaking the third layer 763 on the third cut 760 in the horizontal direction is applied, a non-selected layer previously covered by the third layer 763 may be partially exposed, and thus, an effect cut to which the first reproduction effect is actually applied may be unnaturally displayed.

FIGS. 11A-11D and 12A-12D illustrate screens in which the first reproduction effect according to an exemplary embodiment is applied. In the present embodiment, it is assumed that the third layer 763 of the third cut 760 illustrated in FIGS. 7 and 8A-8E is selected as a layer to which the first reproduction effect is to be applied, a direction in which the first reproduction effect is to be applied is set to be a horizontal direction, and a degree to which the first reproduction effect is to be applied is set to be normal.

Figure 11A:
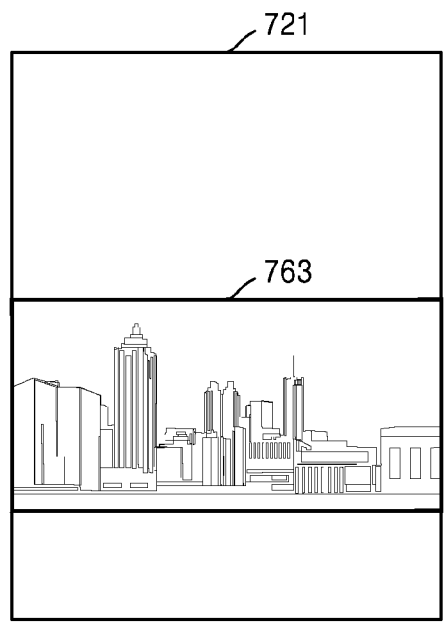
Figure 11B:
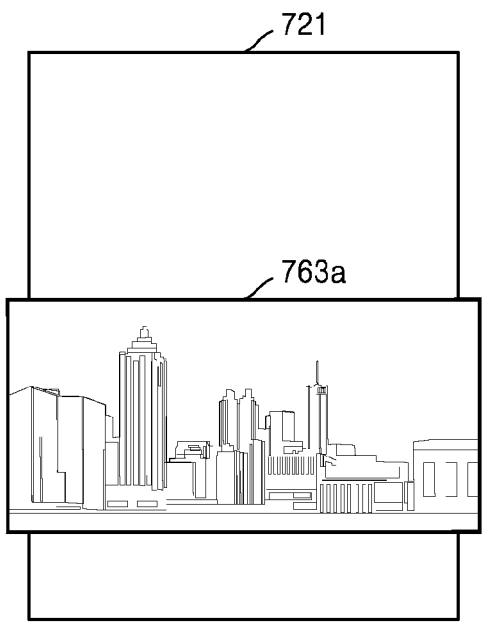
Figure 11C:
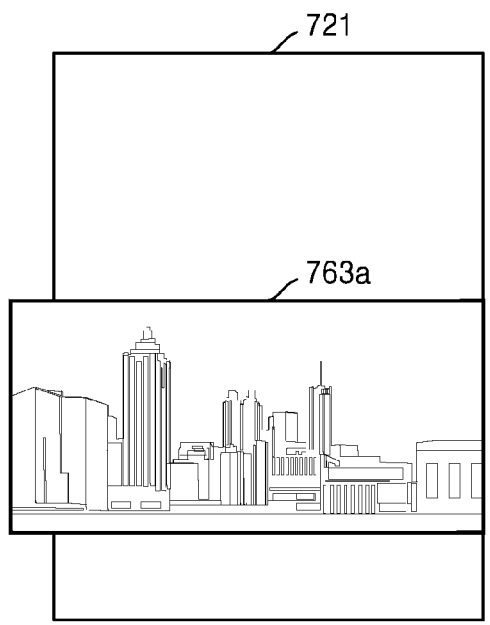
Figure 11D:
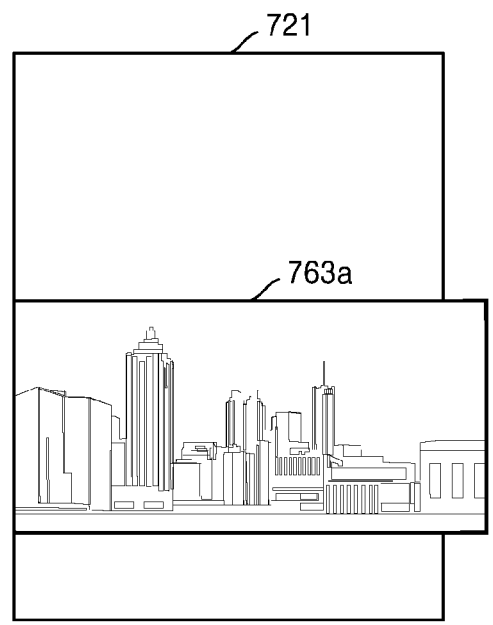

FIGS. 11A-11D illustrate a screen in which the first reproduction effect is applied to the third layer 763 according to an exemplary embodiment. FIG. 11A illustrates the third layer 763 displayed on the canvas 721. FIG. 11B illustrates a third expanded layer 763a obtained by expanding the third layer 763 satisfying the first expansion condition. FIGS. 11C and 11D illustrate a result of applying the first reproduction effect of shaking the third expanded layer 763a with respect to the canvas 721 in the horizontal direction. As illustrated in FIGS. 11C and 11D, even if the first reproduction effect of shaking the third expanded layer 763a in the horizontal direction is applied, no portion of the canvas 721 covered by the expanded layer 763a in the horizontal directions is exposed.

Figure 12A:
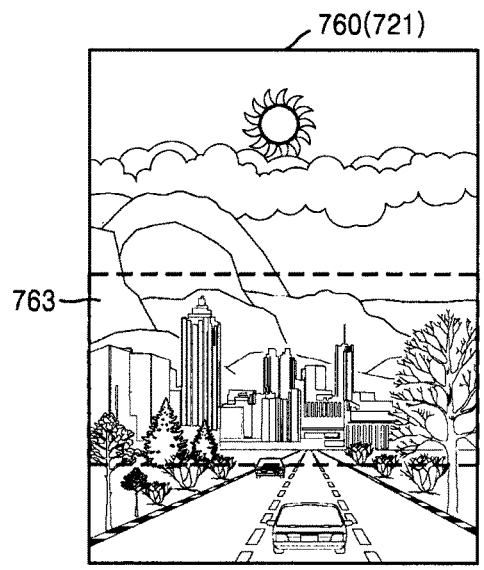
Figure 12B:
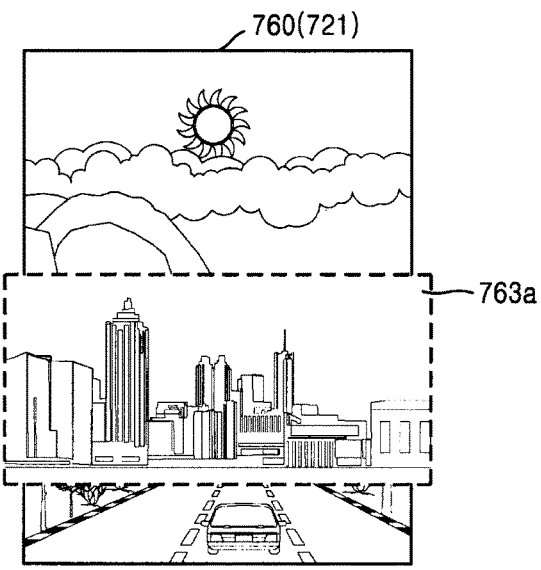
Figure 12C:
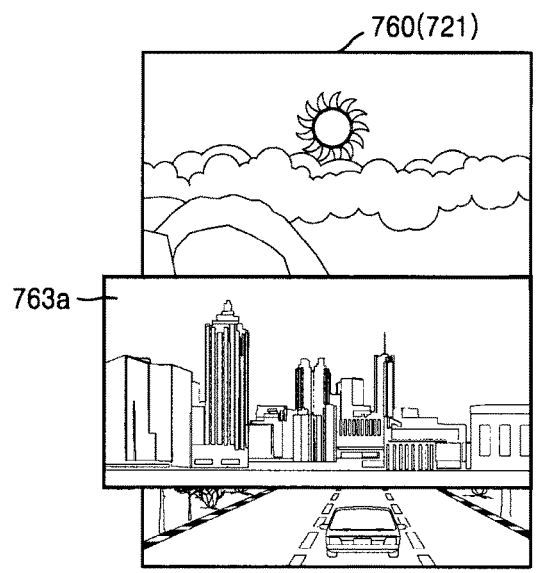
Figure 12D:
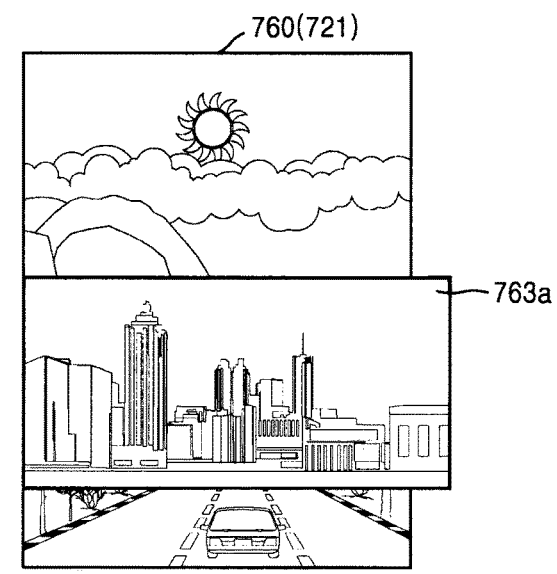

FIGS. 12A-12D illustrate a screen in which the first reproduction effect is applied to the entire third cut 760 according to an exemplary embodiment. FIG. 12A illustrates the third cut 760 displayed on the canvas 721. Here, the size of the canvas 721 is the same as that of the third cut 760. FIG. 12B illustrates the third cut 760 including the third expanded layer 763a obtained by expanding the third layer 763 satisfying the first expansion condition. FIGS. 12C and 12D illustrate a result of shaking the third expanded layer 763a with respect to the third cut 760 in the horizontal direction. As illustrated in FIGS. 12C and 12D, when the first reproduction effect of shaking the third expanded layer 763a on the third cut 760 in the horizontal direction is applied, no portion of a non-selected layer previously covered by the expanded layer 763a is exposed, and thus, an effect cut to which the first reproduction effect is actually applied may be naturally displayed.

Figure 13:
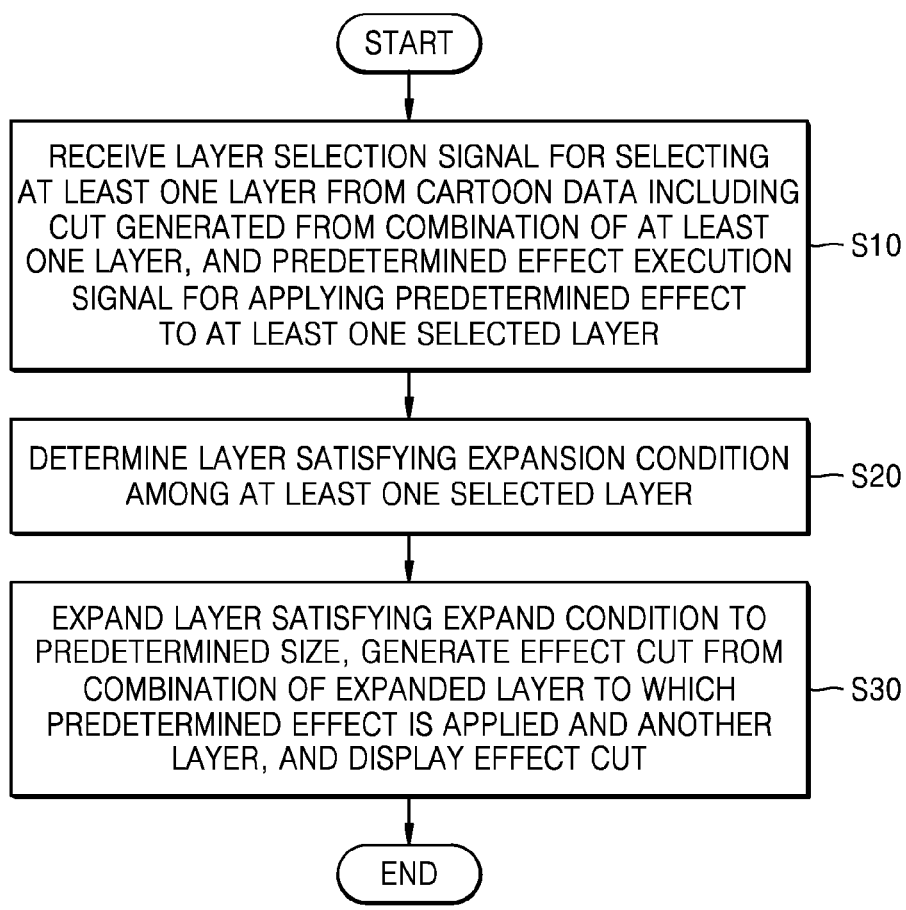
FIG. 13 is a flowchart of a cartoon data generating method according to an exemplary embodiment.

FIG. 13 is a flowchart of a cartoon data generating method according to an exemplary embodiment. Referring to FIG. 13, the cartoon data generating system 100 of FIG. 1 receives, from the user terminal T1 of FIG. 6, a layer selection signal for selecting at least one layer included in a cartoon data cut and a first reproduction effect application signal for applying the first reproduction effect to the at least one selected layer (operation S10). The cartoon data generating system 100 may receive, from the user terminal T1, at least one among a first reproduction effect application direction setting signal, a first reproduction effect application degree setting signal, a first reproduction effect application time (e.g., time when a selected layer appears on a screen, time when a cut starts, etc.) setting signal, a first effect application speed (e.g., very slow, slow, normal, fast, very fast, etc.) setting signal, a first effect application delay (e.g., none, very short, short, normal, long, very long, etc.) setting signal, and a first effect repetitive application number (limitless, 1, 2, 3, 4, 5, etc.) setting signal, which are included in the first reproduction effect application signal.

When the layer selection signal and the first reproduction effect application signal are received from the user terminal T1, the cartoon data generating system 100 determines a layer satisfying an expansion condition among the at least one selected layer (operation S20). Here, the expansion condition may include a condition of determining a layer causing cartoon data from being unnaturally displayed, and include a first expansion condition and a second expansion condition. The first expansion condition should be understood to include a case in which an interface surface of a layer selected to correspond to a direction in which the first reproduction effect is to be applied and an interface surface of the cartoon data cut are the same in a state in which this direction is set to apply the first reproduction effect. The second expansion condition should be understood to include a case in which the difference between interface surfaces of a layer selected to correspond to a direction in which the first reproduction effect is to be applied and the cartoon data cut is in a predetermined range, in a state in which this direction is set to apply the first reproduction effect. The cartoon data generating system 100 may determine, as layers to which the expansion condition is not to be applied, a selected layer present in a cut, a layer which is selected to correspond to the direction in which the first reproduction effect is to be applied the difference between the interface surface of which and the interface surface of the cartoon data cut exceeds the predetermined range, and a layer which is greater than the cut in size.

When a layer satisfying the expansion condition is determined, the cartoon data generating system 100 expands this layer to a predetermined size, generates an effect cut from a combination the expanded layer to which the first reproduction effect is applied and another layer, and displays the effect cut (operation S30). Here, the applying of the first reproduction effect may include applying, to the layer expanded to the predetermined size, not only a result of setting a direction in and/or a degree to which the first reproduction effect is to be applied, which is received from the first receiving unit 110, but also a result of setting at least one among a time when the first reproduction effect is to be applied, a speed at which the first reproduction effect is to be applied, a duration for which applying of the first reproduction effect is to be delayed, and a number of times that the first reproduction effect is to be repeatedly applied. The cartoon data generating system 100 may adjust a degree to which the layer satisfying the expansion condition is to be expanded, based on the first reproduction effect direction setting signal and/or the first reproduction effect degree setting signal. The cartoon data generating system 100 may not only apply the first reproduction effect to layers to which the expansion condition is not to be applied but also generate an effect cut from a combination of the layers to which the expansion condition is not applied and the first reproduction effect is applied and another layer. The cartoon data generating system 100 may restore the expanded layer to the original size thereof after the displaying of the effect cut ends.

As described above, according to the one or more of the above exemplary embodiments, cartoon data may be created by applying a desired effect to a layer selected from a cartoon data cut having at least one layer, thereby causing users who view the cartoon data to have an interest in the cartoon data.

Also, cartoon data may be created in a natural way by expanding a layer selected from a cartoon data cut having at least one layer to a predetermined size and applying a desired effect to the expanded layer, thereby causing users who view the cartoon data to have an interest in the cartoon data.

Also, cartoon data may be created in a natural way by expanding a layer selected from a cartoon data cut having at least one layer to a predetermined size, applying a desired effect to the expanded layer, and reducing the size of the expanded layer to the original size thereof, thereby causing users who view the cartoon data to have an interest in the cartoon data.

The one or more of the above exemplary embodiments may be embodied as a computer program that can be executed in a computer using various components. The computer program may be recorded on a computer-readable recording medium. Examples of the computer-readable recording medium may include a magnetic recording medium (a hard disc, a floppy disc, a magnetic tape, etc.), a floptical recording medium (a CD-ROM, a DVD, etc.), a magneto-optical medium (e.g., an optical disk), and a hardware device (e.g., a ROM, a RAM, a flash memory, etc.) specially designed to store and execute program commands. Furthermore, the computer-readable recording medium may be a formless medium that can be transmitted and distributed in a network, e.g., software or an application.

The computer program may be designed and configured specially for the inventive concept or would be obvious to those of ordinary skill in the field of computer software. Examples of the computer program include not only machine language codes prepared by a compiler but also high-level language codes executable by a computer using an interpreter.

The use of the terms "a," "an," and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Finally, the operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A system for generating cartoon data, which includes at least one cut each illustrating one corresponding scene and having a plurality of layers forming the cut, the system comprising:
at least one processor in communication with a plurality of user terminals through a computer network, and configured to include a plurality of functional units for executing a plurality of functions, the functional units including,
a receiving unit that receives a layer selection signal for selecting at least one layer from a select cut of the cartoon data and an effect application signal for applying a predetermined effect to the at least one selected layer, the select cut being previously generated and displayed on a cartoon data generation screen;
a determination unit that determines a layer satisfying a predetermined expansion condition from among the at least one selected layer in the previously generated select cut; and
a controller that expands a size of the layer satisfying the predetermined expansion condition to a predetermined size relative to other layers in the select cut while maintaining a size of the other layers of the select cut, applies the predetermined effect to the expanded layer, and displays the select cut with the predetermined effect applied to the expanded layer on a display unit of a user terminal;
wherein the select cut has an interface surface including an edge around the select cut and the expanded layer has an interface surface including an edge around the expanded layer, and when the expanded layer has been expanded to the predetermined size within the display unit so that a portion of the edge of the interface surface of the expanded layer extends outside the interface surface of the select cut, the portion of the edge of the interface surface of the expanded layer does not move inside the edge of the interface surface of the select cut when the predetermined effect is applied to the expanded layer.

2. The system of claim 1, wherein the determination unit determines, as the layer satisfying the predetermined expansion condition, the at least one selected layer having the interface surface which is the same as the interface surface of the select cut.

3. The system of claim 1, wherein the determination unit determines, as the layer satisfying the predetermined expansion condition, the at least one selected layer, a distance between the edge of the interface surface of the expanded layer and the edge of the interface surface of the select cut being within a predetermined range.

4. The system of claim 1, wherein the controller adjusts a degree by which to expand the layer satisfying the predetermined expansion condition, based on a direction in which and a degree to which the predetermined effect is to be applied as indicated in the effect application signal received by the receiving unit.

5. The system of claim 1, wherein the layer satisfying the predetermined expansion condition is expanded from an original size and the effect cut is displayed, and when displaying of the effect cut ends, the controller restores the expanded layer to the original size.

6. The system of claim 1, wherein each of the at least one cut is provided in a corresponding image file.

7. A user terminal for displaying cartoon data which includes at least one cut each illustrating one corresponding scene and having a plurality of layers forming the cut, comprising:
a display unit configured to display, according to a layer selection signal, at least one layer selected from a select cut of the cartoon data, and display, according to an effect application signal for applying a predetermined effect to the at least one selected layer, a layer satisfying a predetermined expansion condition, the select cut being previously generated displayed on a cartoon data generation screen; and
a controller configured to expand a size of the layer satisfying the predetermined expansion condition to a predetermined size relative to other layers in the select cut while maintaining a size of the other layers of the select cut, apply the predetermined effect to the expanded layer, and output the select cut with the predetermined effect applied to the expanded layer on to the display unit,
wherein the select cut has an interface surface including an edge around the select cut and the expanded layer has an interface surface including an edge around the expanded layer, and when the expanded layer has been expanded to the predetermined size within the display unit so that a portion of the edge of the interface surface of the expanded layer extends outside the interface surface of the select cut, the portion of the edge of the interface surface of the expanded layer does not move inside the edge of the interface surface of the select cut when the predetermined effect is applied to the expanded layer.

8. The user terminal of claim 7, wherein the controller adjusts a degree by which to expand the layer satisfying the predetermined expansion condition, based on a direction in which and a degree to which the predetermined effect is to be applied as indicated in the effect application signal.

9. The user terminal of claim 7, wherein the layer satisfying the predetermined expansion condition is expanded from an original size and the effect cut is displayed, and when displaying of the effect cut ends, the controller restores the expanded layer to the original size.

10. A method of generating cartoon data which includes at least one cut each illustrating one corresponding scene and having a plurality of layers forming the cut, the method comprising:
receiving, by a receiving unit, a layer selection signal for selecting at least one layer from a select cut of the cartoon data and an effect application signal for applying a predetermined effect to the at least one selected layer, the select cut being previously generated and displayed on a cartoon data generation screen;
determining, by a determination unit, a layer satisfying a predetermined expansion condition from among the at least one selected layer in the previously generated select cut; and
expanding, by a controller, a size of the layer satisfying the predetermined expansion condition to a predetermined size relative to other layers in the select cut while maintaining a size of the other layers of the select cut, applying the predetermined effect to the expanded layer, and displaying the select cut with the predetermined effect applied to the expanded layer on a display unit of a user terminal;
wherein the select cut has an interface surface including an edge around the select cut and the expanded layer has an interface surface including an edge around the expanded layer, and when the expanded layer has been expanded to the predetermined size within the display unit so that a portion of the edge of the interface surface of the expanded layer extends outside the interface surface of the select cut, the portion of the edge of the interface surface of the expanded layer does not move inside the edge of the interface surface of the select cut when the predetermined effect is applied to the expanded layer.

11. The method of claim 10, wherein the determining of the layer satisfying the predetermined expansion condition comprises determining, as the layer satisfying the predetermined expansion condition, a layer having the interface surface which is the same as the interface surface of the select cut.

12. The method of claim 10, wherein the determining of the layer satisfying the predetermined expansion condition comprises determining, as the layer satisfying the predetermined expansion condition, the at least one selected layer, a distance between edge of the interface surface of the expanded layer and the interface surface of the cut being within a predetermined range.

13. The method of claim 10, wherein the expanding of the layer satisfying the predetermined expansion condition and the generating of the effect cut comprises adjusting a degree by which to expand the layer satisfying the predetermined expansion condition, based on a direction in which and a degree to which the predetermined effect is to be applied as indicated in the effect application signal.

14. The method of claim 10, further comprising restoring the expanded layer to an original size thereof after displaying of the effect cut ends, performed by the controller.

* * * * *